Figure 1:
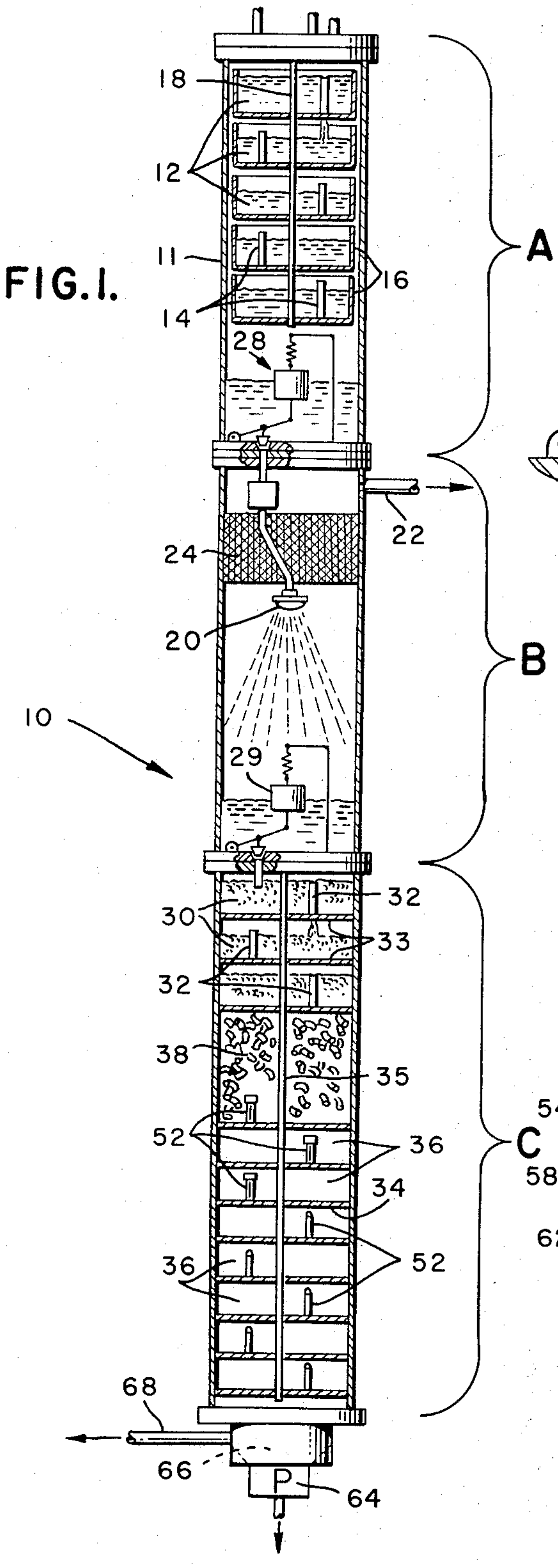

POLYCONDENSATION APPARATUS

Filed June 11, 1963

INVENTOR.
EMERICK J. DOBO
BY Leonard A. Willson, Jr.
ATTORNEY

United States Patent Office 3,359,074

Patented Dec. 19, 1967

3,359,074
POLYCONDENSATION APPARATUS
Emerick J. Dobo, Cary, N.C., assignor to Monsanto Company, a corporation of Delaware
Filed June 11, 1963, Ser. No. 287,065
4 Claims. (Cl. 23—283)

This invention relates generally to polymerization processes and apparatus and, more particularly, to a continuous polycondensation process and apparatus for the preparation of synthetic linear polymers which polymerize with the evolution of vaporous by-products.

Though the following disclosure will, in great measure, have particular reference to polyesters generally, it is to be emphasized that the process and apparatus embodying my invention is, with minor modifications, adaptable to the preparation of polycondensation polymers generally and is, therefore, not intended to be limited to any one of several polymers so characterized. For example, and in particular, it is intended that the herewith disclosed process and apparatus be employed in the preparation of the polyamides generally known as nylon, as will be more fully related to hereinbelow.

The production of the novel class of film- and fiber-forming linear polyesters of terephthalic acid and a glycol of the series $HO(CH_2)_nOH$, where "$n$" is an integer from 2 to 10 inclusively, is fully disclosed in U.S. Patent 2,465,319 to Whinfield and Dixon. From a commercial standpoint, one of the most attractive polymers of this class is polyethylene terephthalate; and the most promising process for its production comprises carrying out an ester interchange between ethylene glycol and dimethyl terephthalate to form a bis-2-hydroxy-ethyl terephthalate monomer which is polymerized to polyethylene terephthalate under reduced pressures and at elevated temperatures. On the other hand, it is to be understood that my invention may as well be employed in a direct esterification process wherein terephthalic acid itself is polycondensed with excess glycol in the presence of an esterification catalyst, such as p-toluene sulfonic acid, which procedure has been found disadvantageous in view of the inordinate amount of time required to reflux the acid with the glycol to effect solution thereof.

In the continuous preparation of molten polyethylene terephthalate by the preferred trans-esterification procedure, ethylene glycol and dimethyl terephthalate, along with selected catalysts, are continuously filled into an ester-interchange column, conventionally maintained at superatmospheric pressure, and a monomer, i.e., bis-2-hydroxy ethyl terephthalate, and excess glycol are continuously withdrawn from the bottom of the column. Thereafter, the monomer of the above composition is continuously fed into a prepolymerization or evaporator chamber, which serves to carry out polymerization of the monomer to form low molecular weight polymer, while continuously withdrawing glycol from the polymerizing liquid. The effluent, in the form of bis-2-hydroxy-ethyl and minor portions of low molecular weight polyethylene terephthalate, is thereafter fed into a "finisher" or final polymerization vessel, wherein further polymerization with further evolution of glycol is effected. The effluent polymer, suitable for forming into films or filaments, is withdrawn from the final polymerization vessel by means of, for example, a screw or gear pump.

Heretofore, in carrying out the trans-esterification procedure here generally referred to, it has been found necessary to employ a complex, multi-component system. For example, such a system might well comprise an ester exchange column of the type described in detail in U.S. Pat. No. 2,905,707, wherein glycol is reacted with dimethyl terephthalate in the presence of suitable catalysts;

the prepolymerization column may be of the type described in U.S. Patent 2,727,882; and the final polymerization vessel may be of the type disclosed in U.S. Patent 2,758,915, which apparatus comprises an elongated, horizontally disposed cylindrical housing enclosing two revolving shafts on which are mounted solid discs and wheels which intermesh to generate polymer surface and surface renewal necessary to attain a practicable rate of glycol removal. An inspection of such typical apparatus reveals that present day polycondensation systems are complex and involve the use of many components, each of which may be of considerable complexity, which have naturally evolved out of attempts to satisfy the particular conditions and demand incident to polycondensation processes generally. As an example, present day "finishers," or final polymerization vessels, typically employ a maze of screens, discs, rotors, and other ingenious schemes of compartmentation, mixing, and surface renewal. Also, heretofore, commerical practice conventionally dictates the use of horizontal-flow-type finisher chambers due to the fact that vertical-flow-type finishers present the problem of controlling liquid levels at each of the various finisher stages without employing prohibitively cumbersome, complex and expensive level control mechanisms.

A further shortcoming of conventional systems lies in their impracticality for use in smaller scale operations in that components normally comprising such systems are not susceptible to scale-down without suffering prohibitively high unit product cost due mainly to a disproportionately high capital investment; also many conventional designs are utterly incapable of being scaled down to capacities such as may be desired in experimental investigations. A versatile low cost, low capacity polycondensation system which could render laboratory-scale operations economically feasible is a long recognized need in the industry. The present invention answers such a need without sacrifice to the significant advantages to be realized in its utilization in large-scale, commercial operations.

The conventional arrangements seem quite natural when one considers the problems that are encountered in attempting to arrive at a commercially feasible continuous polycondensation system and process. Before the advent of such continuous systems, polymerization of bis-2-hydroxy-ethyl terephthalate had been carried out batch-wise in large reaction vessels or autoclaves wherein provision was made to agitate the polymerizing mass and remove vaporized ethylene glycol.

Accurate control of stage-to-stage changes in pressure and temperature relationships, particularly in the initial stages of the reaction was necessary in order to prevent undue vaporization of the monomeric material (which would otherwise condense in the plug condenser line) and undue loss of low molecular weight polymeric material through vaporization; these considerations, plus the necessity for thorough agitation throughout had made it difficult to prepare polyethylene terephthalate by the more commercially attractive continuous process. However, it has since been determined that continuous production of polymer can be satisfactorily achieved by carrying out the process in three stages (conventionally by means of three separate, independently housed complexes maintained at varying conditions of temperature and pressure) consisting of a first stage, wherein the ethylene glycol and dimethyl terephthalate are reacted in a continuous fashion to form bis-2-hydroxy-ethyl terephthalate in the presence of excess glycol; a second stage wherein the bis-2-hydroxy-ethyl terephthalate monomer is prepolymerized during glycol removal by means of agitation at atmospheric or subatmospheric pressure conditions to form a liquid prepolymer; the third and final stage wherein the prepolymer is further and continuously polymerized to form the desired high molecular weight, fiber- and film-forming polyethylene terephthalate. In the typical finisher, or final polymerization apparatus, the various rotors, discs, and screens are employed in an attempt to effect continuous surface renewal of a polymerizing mass while preventing intermixing of low molecular weight polymer present in the earlier stages with high molecular weight polymer formed in the latter stages of polymerization; the end sought and seldom attained is that of plugged-flow wherein, ideally, each succeeding "plug" of polymer moves in time sequence along the length of the polymerizer without intermixing with succeeding or proceding "plug" to thereby assure a more uniform degree of polymerization.

With the above in mind, it will be appreciated that present day polycondensation processes and apparatus are of considerably complexity, involving the use of individually housed units which necessitate the employment of many moving parts as, for example, pumps between such units and screw flights and screens employed to define the staging in conventional finishers. Furthermore, each of such units typically operates at separate temperature conditions, thus requiring many complex heat control arangements. Because of their complexity, such systems are necessarily susceptible to costly malfunctions, laborious maintenance procedures and considerable downtime. Also, the capital costs of such conventional systems necessitates extremely large scale operations if they are to be commercially feasible. Therefore, an analysis of present day polycondensation processes and apparatus for purposes of combination, diversification and simplification is indicated.

It is therefore an object of my invention to provide a novel polycondensation method and apparatus.

It is a further object of this invention to provide a novel method and apparatus for use in the continuous polymerization of linear condensation polymers, in the practice of which there is utilized a fully integrated commonly housed polycondensation system. Still another object of this invention is an integrated continuous polycondensation apparatus having a minimum of moving parts, which apparatus is so designed as to be susceptible to operation at a single temperature condition. A further object of my invention is an integrated polycondensation apparatus susceptible to operation at a single temperature condition and employing the minimum of moving parts, which apparatus is economically conducive to small-scale operations. Another object is to provide a polycondensation system of such design as to make possible substantial savings in costs of construction over presently available systems. Yet another object of this invention is to provide a polycondensation apparatus susceptible to ready conversion to the processing of diverse condensation polymers. A still further object of my invention is a novel finisher, or final polymerizer, of simplified construction and operation, subject to a minimum of down-time. Another object is a vertical-flow type finisher apparatus for use in polycondensation systems, which apparatus preferably employs no moving parts and which possesses improved multistage level control functions. Still another object of this invention is the provision of an improved and simplified level control device for use in polycondensation systems employing a vertical flow finisher or final polymerizer. A further object is to provide a method of effecting multi-stage level control within the finishing section of a polycondensation system wherein the finisher is of the vertical-flow type. A still further object of my invention is to provide an improved method for the preparation of linear condensation polymers wherein a single temperature condition may be employed, thereby eliminating bulky and costly heat control arrangements. Another object of my invention is an improved method for the preparation of linear condensation polymers wherein the evaporation or prepolymerizing phase is carried out by first throttling, then forming a falling film of the polymerizable liquid composition. A further object is a method in independently controlling the fluid levels of any number of stages within a multi-stage, vertical-flow type finisher or final polymerizer, whereby the fluid levels are independently maintained below a desired maximum level. Yet another object of my invention is, in such a method of multi-stage level control, to control the rate of interstage liquid flow by variations in interstage pressure drop which variations are accomplished by varying the area of interstage gas discharge.

According to the present invention, the foregoing and other objects are attained by providing a novel process and apparatus for the continuous processing of linear polycondensates wherein a single column houses the entire system, which column may be operated at a single temperature condition throughout. The various functions incident to a typical polycondensation process are carried out within the present column while employing substantially no moving parts and is so designed as to be generally applicable to linear condensation polymerization systems in general insofar as they involve the typical steps of (1) true monomer formation, (2) evaporation of volatile byproducts, and (3) finishing or final polymerization. Such a column, when disposed in operative position, would extend vertically and consist of there major zones, viz. reactor, evaporator, and finisher zones, in descending order. Such process and apparatus is susceptible to heretofore economically unattainable miniaturization, thereby rendering it feasible for laboratory-scale operations, while at the same time capable of affording substantial savings in capital investment in large-scale commercial operations. The finisher section of my polycondensation apparatus is characterized by a series of superposed stages which are level-controlled by a novel and simple device which automatically functions to regulate the level in each stage in a manner whereby each stage level is independently maintained below a predetermined maximum level. This is accomplished by varying the interstage gas discharge area to thereby vary the interstage pressure drop, resulting in a liquid flow variation inverse to the variation in interstage gas discharge area.

The following detailed description, examples and drawings are now referred to for a better understanding of my invention, with the provision that they should be construed as illustrating, and not limiting, the true and full scope of my invention.

Figure 2:
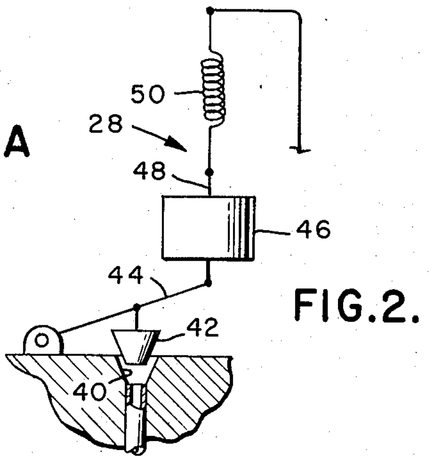
Figure 3:
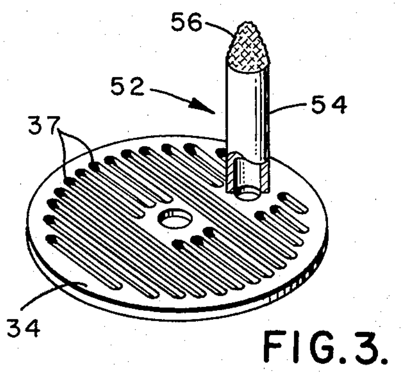
Figure 4:
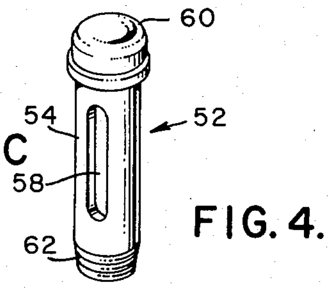

In the drawing, FIG. 1 is a generalized view of one possible embodiment of my invention showing an integrated polycondensation column sectionalized to better disclose its internal construction; FIG. 2 is a detail of one of the zone level control valve assemblies shown generally in FIG. 1;

FIG. 3 is a detail of one possible embodiment of the level control device generally indicated in FIG. 1; and FIG. 4 illustrates another possible embodiment of the level control device.

Referring, now, more particularly to FIG. 1, the polycondensation system 10 is seen to be in the form of a vertically extending, horizontally partitioned column 11 defining a reaction zone, an evaporation zone and a finisher, or final polymerization zone, indicated by brackets labeled A, B, and C, respectively.

The reactor zone or chamber A is essentially a vertical column of a number of discrete reactor stages 12. The output of one reaction stage becomes the input of the next successive stage therebelow, as shown in FIG. 1. Simple standpipe overflow controls 14 operate to individually control the level and therefore the volumes of the reactants in the various stages, while, at the same time, providing a convenient vapor outlet. The reactor stages 12 may be defined by simple buckets 16 suspended centrally by a common suspension rod or cable 18, the standpipes 14 preferably being formed integrally with the bottom of such buckets and communicating therethrough to discharge into the next lower bucket. Alternatively, such reactor stages may as well be defined by partition plates positioned substantially equi-distant along the length of the reactor zone, which plates may be wedgingly engaged with the internal wall of the column 11. The column may be constructed of any suitable non-reacting material, such as stainless steel, glass, or the only criterion being that it have sufficient structural integrity to withstand anticipated reactor pressures, depending upon reactant properties and the polymer to be obtained. For example, the reactor zone may be operated at atmospheric pressure when producing nylon, but may range beyond 75 p.s.i. in a polyester system.

The design of the reactor for use in a polyester system is based on simple kinetics. By increasing the operating temperature of the reactor section, it is found that one can enormously increase the reaction rate by increasing the specific reaction rate constant according to the general Arrhenius equation. By allowing the pressure of the by-products (methanol in the case of an ester interchange between dimethyl terephthalate and a glycol) to build up over atmospheric pressure, the operating temperature of the reactor can be raised to a suitable level. In addition to increasing the kinetic rate, in the ester interchange process, the relative volatility of the reactants with respect to the by-products may be considerably decreased, thereby retarding loss of chemical and minimizing the adverse effects of possible sublimation. Another advantage of operating the reactor section at substantial superatmospheric pressures lies in the fact that higher enthalpy may be imparted to the reacting medium due to the higher temperatures that may be utilized by virtue of such high pressures for use in subsequent operations, viz., evaporation. As will be further related to, this increased enthalpy makes it possible to flash vaporize most of the excess chemical (ethylene glycol in the case of the polycondensation of polyethylene terephthalate excess water in the case of nylon) on passing from the reactor zone A to the evaporator zone B.

When the reactor is operated under pressure, a pressure gradient is generated between the reactor A and the evaporator B, the latter preferably being operated at atmospheric pressure or below. Consequently, it is possible to subject the fluid departing the reactor to a throttling process. This is partially accomplished by a simple, internally-contained reactor zone level control 28, in the form of a spring-biased, float-actuated valve, shown in greater detail in FIG. 2, which valve operates to control the level at the bottom of the reactor section A to thereby constitute an inter-zone pressure seal between the reactor and evaporator zones and prevent pressure blow-out from the reactor into the evaporator. The reaction mixture, which, in the case of polyethylene terephthalate, is in the form of bis-2-hydroxy-ethyl terephthalate monomer and excess ethylene glycol departs the reactor zone A to pass to a spray nozzle 20, where the remaining portion of the throttling process takes place to vaporize most of the remaining ethylene glycol.

The throttling process involves a condition of constant enthalpy wherein the sensible heat of the liquid fed from the reactor zone is converted into the latent heat necessary for flash evaporation of the excess chemical, which excess is led off through vent 22, after having circulated through demisting material 24, which functions to entrain non-vaporized chemical that might otherwise be carried off with the relatively volatile by-products. It will be appreciated that the evaporation ratio due to throttling increases with increasing feed temperature and with decreasing pressures in the evaporator section. In the preferred operating range, for the processing of polyethylene terephthalate wherein the entire system is maintained between 250° C. and 275° C. and the reactor section is maintained at approximately 75 p.s.i.g., the high enthalpy of the reactor discharge is sufficient to flash vaporize most of the excess chemical in the immediate vicinity of the spray nozzle 20.

The discharge from the spray nozzle 20 in the evaporator zone B is preferably of hollow-cone-shaped configuration, whereby the reaction mixture is caused to impinge against the heated interior surface of the evaporator, resulting in what is essentially a falling-film evaporation process, which process nicely supplements the evaporation due to throttling. The higher heat transfer coefficient obtained in a falling-film evaporator is largely due to the fact that much greater linear velocities are obtained for a given weight of fluid than would otherwise obtain if the tube were substantially full. This falling-film evaporation process supplies the additional heat which may be found necessary to insure complete evaporation of the remaining excess chemical, if any, although it is quite possible that either the falling-film or throttling action may be found self-sufficient under certain process conditions.

The evaporator zone B can be operated under a vacuum as well as under substantially atmospheric conditions, keeping in mind that the degree of polymerization of the prepolymer produced in the evaporator is dependent on the pressure maintained in such zone. The prepolymer product, in the form of bis-2-hydroxy-ethyl-terephthalate or low molecular weight polyethylene terephthalate, or mixtures of the two, depending on process conditions, leaves the evaporator zone by way of a simple evaporator zone level control 29 substantially identical to reactor zone level control 28. This control 29 functions as a pressure seal on the prepolymer fluid to passing from the relatively higher pressure of the evaporator zone B to that of the high vacuum maintained within the finisher zone C.

Referring now to the details of the structural features and operation of the finisher zone or final polymerizer C, it will be appreciated that, in the normal condensation polymerization process, a small molecule is eliminated as a reaction by-product. This reaction by-product must be removed rapidly and continuously to allow the final polymerization reaction to proceed efficiently. This necessity for efficient reaction by-product removal is complicated by the fact that, as polymerization of the reacting fluid progresses, there is an accompanying increase in its viscosity, with the result that, in the earlier stages of the finisher or final polymerizer, the controlling rate regarding by-product evolution and removal is one of simple kinetics; whereas, as the reacting fluid advances toward the outlet end of the finisher, the controlling mechanism shifts to what may be characterized as that of diffusion. The problem presented by this shifting of the controlling mechanism due to increasing viscosity is compounded by the further problem encountered in regulating the fluid levels of the various stages of a vertical-flow type finisher, such level control being essential to provide the desired hold up of the reacting medium at the various levels within the finisher. The present finisher is designed to answer both of these problems in a most simplified and effective manner, as well as offering a convenient exhaust route for ethylene glycol vapors.

Referring again to FIG. 1, it is seen that the finisher zone C, in its upper stages, bears strong resemblance to the reactor stages 12 of the reactor zone A. Because of the lower viscosity at the earlier stages of the finisher and because of the high rate of gaseous evolution of reaction by-product, which evolution serves to agitate the contents of the upper finisher stages, the mode of such earlier stages is that of stirred-tank stages 30. These upper-finisher, stirred-tank stages 30 are each provided with simple standpipes 32 for stage level control purposes, these standpipes being of much the same construction as that of the reactor stage standpipes 14 employed in the reactor zone A. The upper finisher stages 30 may be defined by any suitable means such as buckets or plates, such as the imperforate partition discs 33, which discs may be wedgingly engaged against the wall of the finisher zone, or suspended at fixed points along a suspension line 35.

In the intermediate and lower stages of the finisher zone C, the mechanism limiting the rate of by-product vaporization begins to shift from that of simple kinetics to include that of diffusion due to the increasing viscosity of the reacting medium. It therefore becomes necessary to modify the structural characteristics of these intermediate and lower finisher stages in order to generate the fluid surface and surface renewal necessary for efficient diffusional operations. Accordingly, these stages are defined by perforated partition discs 34 or buckets having perforated bottoms to thereby define what may be termed "plug-flow" type reactor stages 36. Where the partitioning means takes the form of a disc, such disc is preferably in the form of a turbogrid plate 34, best seen in FIG. 3. Such a plate or disc has formed therein substantially equi-spaced, chordwise extending slots 37, which slots are operative to generate the necessary surface renewal within the relatively more viscous fluid medium passing therethrough. In certain polycondensation processes, wherein relatively lower or intermediate ranges of viscosity are encountered, it may be found desirable to provide an additional surface renewal agency in the intermediate finisher stages in order to promote more efficient by-product evolution. Such a surface renewal agent may take the form of conventional packing 38, such as Raschig rings or Berl saddles, which packing may occupy substantially the entire volume of the intermediate stages. The number of intermediate stages which may beneficially employ the additional surface renewal agency in the form of packing is best arrived at by trial and error and is indicated when the viscosity of the reacting medium has reached such a level that an open-coated flow over the individual packing elements does not obtain. From this point downward the remaining finisher stages would more efficiently employ only the slotted plates 34 or seive trays as a surface renewal agency, which plates, by virtue of the viscosity there obtaining, will serve to hold the reacting volume at each of the lower stages the desired period of time and which plates or trays will, of themselves, create the surface renewal necessary for diffusional operations, which are now paramount, to take place. It, of course, follows from the present discussion that, in polycondensation systems where the final level of viscosity is relatively low, it may well be found desirable to provide even the final stages with the packing otherwise employed only in the intermediate stages.

Attention is now directed to FIG. 2, wherein there is illustrated the details of one possible embodiment of the zone level control mechanisms 28, 29 employed in the lower ends of the reactor and the evaporator zones A, B, respectively. Reference will be had to only one possible construction of such a zone level control mechanism in that the controls for both the reactor and the evaporator zones may be of substantially identical construction. Such a control will preferably be in the form of a spring-biased, float-actuated proportional valve having a tapered valve seat 40 shaped to receive a similarly tapered valve number 42. By token of such a configuration, the discharge area through the valve varies according to the displacement of the valve member. The valve member 42 freely depends from pivoted lever 44, the free end of which is hingeably connected to float 46 by means of the resiliently suspended float rod 48. The resilient suspension may be in the form of a tension spring 50 depending from a fixed mounting. The spring suspension serves to render the float 46 and its associated linkage substantially weightless, whereby any variation in the level of fluid in which the float is suspended will be precisely translated into a vertical displacement of the float. For example, a rise in the position of float 46 will be translated into a rise of the valve number 42 relative to the valve seat 40 to thereby define an increasingly large area of discharge through the valve.

Turning now to another significant feature of my invention, there is shown in FIGS. 3 and 4 two possible embodiments of a novel and simplified finisher stage level control 52 designed to be employed in the intermediate and lower finisher stages, insofar as such stages employ perforated discs or plates 34, or sieve trays, wherein the interstage fluid flow takes place through such discs, as opposed to the upper stages, wherein the interstage flow takes place by way of upper finisher stage standpipes 32, similar to the reactor stage standpipes 14. The novel features of the herewith disclosed finisher stage level controls constitute one possible construction which may be employed in the practice of my method of individually controlling the liquid level within various stages of a vertical-flow finisher, which method is based on the concept of controlling the rate of interstage liquid flow by generating variations in interstage pressure drop, which variations are accomplished by varying the area of interstage gas discharge to thereby maintain the liquid level within a given finisher stage below a desired maximum. One way of accomplishing this variation of interstage gas discharge area is to provide an interstage gas passage independent of the interstage liquid passage, which passage is so designed that its cross-sectional area is subject to a controlled variation induced by variations in the liquid level of a given stage, which variations in area induce variations in the interstage fluid pressure drop.

For example, in the embodiment illustrated in FIG. 3, such a finisher stage level control 52 may be in the form of a cylindrical body portion 54 the lower end of which sealingly engages disc 34 and communicates therethrough to register with the next succeeding finisher stage therebelow. The upper end of body portion 54 is enclosed by a tapered cap portion 56 which is preferably constructed of a substantially fluid-impermeable-gas-permeable material such as small-mesh, stainless steel screening. The dimensions and configuration of the cap portion 56 may vary according to system capacity and the conditions to be obtained, the only essential criterion being that such cap portion vary in cross-sectional area in a direction parallel to the axial dimension of the body portion 54, viz., the cap portion cross-sectional area will vary in a vertical direction as viewed in FIG. 1.

In operation, liquid flow from an upper stage will collect upon and flow through the slotted disc 34. Should the liquid flow through the slots become less than the rate of liquid discharge into a given stage, the liquid level will rise along the body portion 54 to a point of maximum desired height, whereat it will begin to engage the tapered, gas-pervious cap portion 56. Up until this point, the pressure drop between the stage being considered and that stage next below has remained constant due to the fact that the area of gas discharge through the body portion has remained constant. As the liquid level rises along the cap portion 56, a progressively smaller area of gas discharge therethrough is defined, with the result that there is an incremental increase in pressure within the stage under consideration. It will be appreciated that, upon such an increase in pressure within one stage relative to another, the fluid flow therebetween by way of the perforated disc 34 will increase. If such increase in flow is insufficient to arrest or reverse the rise in liquid level, a still smaller gas discharge area will be defined to thereby generate still larger pressure differentials and, concomitantly, still larger interstage liquid flow until that point is reached wherein the pressure drop experienced by gases exhausting through the body portion 54 equals the pressure drop of liquids exhausting through slots 37 of discs 34, at which point the liquid level will stabilize. In practice, the liquid level will hover at a point intermediate the vertical extremities of the cap portion 56 and will be subject to only incipient variations which are immediately compensated by variations in interstage pressure differential and flow rate. It will be apparent that by the use of such a level control in the manner disclosed, there is obtained a continuous monitoring and control of the liquid level in each finisher stage independent of other stages, which control is accomplished by a novel method with the aid of an independently novel and simplified device.

Whereas the level control just described is more suitable in operations wherein it is desired to maintain a substantial liquid level within a given stage, such as in the lower five stages illustrated in FIG. 1, it may be desired to carry out a similar method of finisher stage level control wherein the level is allowed to vary gradually over a wider range. Such requirements may better be satisfied by the employment of a modified form of level control as illustrated in FIG. 4, which embodiment is characterized by a cylindrical body portion 54 similar to that of the FIG. 3 embodiment. However, in this modification, the body portion has formed therein an elongated, vertically extending metering slot 58, which may be of varying width, though a uniform width is illustrated. The upper end of this modified body portion is sealed by means of cap 60 and the lower end thereof sealingly engages one of the perforated discs 34, as by means of threaded portion 62. Similar to the mode of the FIG. 3 embodiment, as the liquid level rises along the body portion to cover a progressively larger portion of the metering slot 58, a progressively smaller area for interstage gas discharge is defined, to thereby generate a greater interstage pressure differential. This interplay continues until that point is reached wherein the pressure drop of the gas flowing through the body portion by way of the metering slot equals the pressure drop of the liquid discharging through the slots 37. By varying the location and dimensions of the metering slot 58, one is enabled to control and stabilize the liquid level over a wide range.

An important advantage to be realized from the practice of this method of finisher stage level control is the ability to obtain accurate regulation, even though monitoring minute pressure variations. This is best appreciated when one considers the fact that, in polyester systems, it is conventional to operate the finisher at a high vacuum, on the order of 1 mm. of mercury. In order to obtain such high vacuum at the finisher discharge, it has been necessary to operate the upper finisher stages at an undesirably lesser vacuum ranging up to 5–7 mm. of mercury. By employing the instant method and apparatus, one is enabled to operate the entire finisher at substantially uniform pressure in that the pressure drop across successive stages is, except for very minor transitory variations, negligible to the extent that the uppermost stage pressure may exceed the lowermost stage pressure by as little as fractions of a millimeter of mercury.

The reaction product of the finisher zone C, in the form of a finished polymer, is removed from the last stage of the finisher by means of any suitable pump-out mechanism 64, such as a viscoelastic, gear, or screw pump, the only consideration being that, due to the high vacuum imposed on the feed side of such a pump-out mechanism, it is desirable to convey the finished polymer from the collection chamber or reservoir 66 to the pump inlet area with a minimum pressure drop. In the case of a gear pump, this may be accomplished by arranging the gear pump housing with respect to the collection chamber 66 in such a manner as to allow the gears to rotate directly in the melt pool contained within the collection chamber to thereby render the pump essentially self-feeding, whereby the hot polymer may be delivered from the high vacuum obtaining within the chamber to a point for further processing.

A vacuum source communicates through part 68 at a point intermediate to the lowermost stage of the finisher and the pump-out section 64, 66, which vacuum is in serial communication with each of the finisher stages by way of stage level controls 52 and standpipes 32 of the upper section of the finisher, the pressure drop through the finisher preferably being less than 1 mm. of mercury in the case of a polyester system, pump-out preferably being accomplished at a pressure of no more than 1 mm. of mercury.

The following examples will further illustrate the principles and practice of my invention, which examples are to be read in connection with the accompanying drawing.

An initial composition comprising 1620 cc. of ethylene glycol, 1500 grams of dimethyl terephthalate and .975 gram of zinc acetyl acetonate was charged from a bomb into the upper reactor stage of reactor zone A at a rate of 2800 cc./hour. The hold-up volume of each reactor stage was 477 cc., and a total of 5 stages were employed with a total capacity of 2,385 cc. The feed temperature was maintained at 220° C. and the reactor zone was operated at a pressure of 75 p.s.i.g. and a temperature of from 260° C. to 275° C. As the reaction proceeded, the methanol evolved was discharged through a top-side vent and the resulting bis-2- hydroxy-ethyl terephthalate monomer issuing from the reactor zone was passed to the evaporator zone B maintained at atmospheric pressure and a temperature of approximately 275° C. The zone level controls 28, 29 in both the reactor and evaporator zones were set to maintain approximately 3½ inches of liquid. By operation of flash vaporization and falling film, excess ethylene glycol was discharged from the evaporator zone and the bis-2-hydroxy-ethyl terephthalate with, possibly, minor portions of very low molecular weight polymer, was passed into the finisher zone C maintained at a temperature of approximately 275° C. and a pressure of 1 mm. of mercury, where the polymerization cycle was brought to a conclusion. The finished zone employed eleven finisher stages, the first five of which were of the stirred-tank type variety equipped with four inch high standpipes 42, which first five stages had a hold-up capacity of 463 cc. each, or a total of 2,315 cc. The succeeding six finisher stages were of the plug flow variety 36, such as shown in the lower five stages of FIG. 1, and, in details in FIGS. 3 and 5, which latter six stages were operated both with and without packing, according to viscosity variations.

In making a typical nylon run, the polycondensation system illustrated in FIG. 1 was readily modified by removing reactor buckets 16 from the reactor zone A and installing a spray nozzle similar to nozzle 20 in the upper end thereof to thereby define a dual-zone evaporator. The nozzle 20 was removed from the lower zone which was then operated purely as a falling film type evaporator. A nylon salt solution of 49 percent solids at a pH of 7.1 was heated to 200° C. in a feed tank introduced into the polycondensation system by way of the modified reactor/upper evaporator zone. The walls of the evaporator zone were defined by two six foot lengths of pipe of three inch inner diameter and was operated at a pressure of about 135 p.s.i.g. and a temperature of approximately 275° C. The solution was introduced into the evaporator zone of the column through a spray nozzle having an orifice diameter of .012 inch and a capacity of .75 g.p.h. The nylon salt was sprayed from the nozzle against the heated walls of the evaporator zone to form a falling film to thereby remove free water, forming hexamethylene adipamide and, possibly, some low molecular weight polymer. The solution was collected in the bottom of the lower, falling film type evaporator zone and metered into the finisher zone by way of an evaporator zone level control similar to that illustrated, which control was set to maintain approximately three inches of solution. In the finisher zone, the monomer was further polymerized at atmospheric pressure and approximately 270° C. The finisher employed comprised five stages of the stirred-tank type, each containing about 450 ml. of solution, these five stages being followed by six stages of the plug-flow type, (the upper ones of which may support packing) to thereby generate surface renewal for further by-product evolution and removal. The residence time of the finisher was found to vary with the flow rate and the amount of packing employed, runs with a retention time of approximately 45 minutes being found satisfactory. Other than as regards process conditions, the nylon process dffered from the polyester process only in the absence of the pressurized reactor zone necessary for carrying out the polyester process.

By employing the techniques embodied in the herewith disclosed process and apparatus constituting my invention, one is availed the advantages of a polycondensation system capable of heretofore unattained flexibility and economy of operation due to its high degree of simplicity and reliability, which system is readily susceptible to small-scale operations, through its significant advantages are as well realized in large-scale commercial operations. Obviously, numerous modifications and variations of the present invention, both in its process and structural aspects, will readily suggest themselves in the light of the above teachings. It is therefore to be understood that, within the scope of the appended claims, the invention may be practiced otherwise than as specifically described.

What is claimed and desired to be patented is:

1. A polycondensation system comprising a single, vertically extending column, said column being transversely partitioned to define, in descending order, a reactor chamber, an evaporator chamber and a finisher chamber, each of said chambers being fully enclosed within said single column and having inlet and outlet means disposed, respectively, at the upper and lower end regions, said evaporator chamber fluidly interconnecting said reactor chamber with said finisher chamber, chamber level control means disposed adacent each of the lower, outlet ends of said reactor and evaporator chambers and operative to continuously monitor the fluid levels within the lower regions of said reactor and evaporator chambers to automatically regulate discharge therefrom in such manner as to maintain reactor and evaporator chamber fluid levels within predetermined ranges, throttling means disposed within said evaporator chamber and having fluid communication with said reactor chamber level control means, whereby reactor chamber discharge supplied by way of said reactor chamber level control means is throttled to such degree as to effect substantial vaporization of the relatively more volatile by-products to thereby facilitate by-product removal.

2. A polycondensation system as recited in claim 1 wherein said throttling means comprises at least one spray nozzle, said nozzle being centrally positioned within said evaporator chamber to thereby cause nozzle efflux to impinge uniformly upon the interior wall of said evaporator chamber to thereby generate a falling-film.

3. The system recited in claim 2 and further comprising by-product vent means mounted adjacent the upper extremity of said evaporator chamber and demisting means interposed between said nozzle and said by-product vent means, said demisting means being operative to entrain non-vaporous materials.

4. A polycondensation system comprising a single, vertically extending column, said column being transversely partitioned to define, in descending order, a reactor chamber, an evaporator chamber and a finisher chamber, each of said chambers being fully enclosed within said single column, said evaporator chamber fluidly interconnecting said reactor chamber with said finisher chamber, said finisher chamber being transversely partitioned to define a plurality of superposed, serially communicating finisher stages, finisher stage overflow control means and polymer surface renewal means disposed at each of said finisher stages, the finisher stage level control means disposed at least within the lower finisher stage being characterized by a vertically extending, open-ended tubular member, gas-permeable, substantially liquid-impermeable means enclosing the upper end of said tubular member, said last mentioned means tapering convergingly upwardly whereby, as the fluid level of a given finisher stage rises above the upper extremity of said tubular member to contact said gas permeable means, the upper entrance area of said tubular member is progressively decreased to thereby increase the pressure drop of gases passing therethrough which, in turn, increases interstage liquid flow.

References Cited

UNITED STATES PATENTS

| | | | |
|---|---|---|---|
| 3,157,619 | 11/1964 | Bell et al. | 260—75 |
| 3,250,747 | 5/1966 | Mitchell et al. | 23—285 X |

JAMES H. TAYMAN, Jr., *Primary Examiner.*

MORRIS O. WOLK, *Examiner.*